United States Patent
Lee et al.

(10) Patent No.: US 7,154,385 B2
(45) Date of Patent: Dec. 26, 2006

(54) VEHICLE-TRAILER BACKING UP SYSTEM USING ACTIVE FRONT STEER

(75) Inventors: Yong H. Lee, Troy, MI (US); Weiwen Deng, Rochester Hills, MI (US); Yuen-Kwok Chin, Troy, MI (US); William C. Lin, Troy, MI (US)

(73) Assignee: General Motors Corporation, Detroit, MI (US)

( * ) Notice: Subject to any disclaimer, the term of this patent is extended or adjusted under 35 U.S.C. 154(b) by 229 days.

(21) Appl. No.: 10/987,556

(22) Filed: Nov. 12, 2004

(65) Prior Publication Data

US 2006/0103511 A1 May 18, 2006

(51) Int. Cl.
*G08B 21/00* (2006.01)

(52) U.S. Cl. .................. 340/431; 340/671; 340/684; 340/691.5; 701/36; 701/41

(58) Field of Classification Search ............... 340/431, 340/671, 684, 691.5, 691.8, 435; 701/36, 701/41
See application file for complete search history.

(56) References Cited

U.S. PATENT DOCUMENTS

| | | | |
|---|---|---|---|
| 5,247,442 A * | 9/1993 | Kendall | 701/41 |
| 5,579,228 A * | 11/1996 | Kimbrough et al. | 701/41 |
| 6,292,094 B1 * | 9/2001 | Deng et al. | 340/431 |
| 6,806,809 B1 * | 10/2004 | Lee et al. | 340/431 |
| 7,032,705 B1 * | 4/2006 | Zheng et al. | 180/446 |
| 2006/0020382 A1 * | 1/2006 | Shin et al. | 701/42 |

OTHER PUBLICATIONS

ANONYMOUS, Device to Assist in Backing up a Trailer, Article, Sep. 2004, 2 pages.

* cited by examiner

*Primary Examiner*—Jeffery Hofsass
*Assistant Examiner*—Edny Labbees
(74) *Attorney, Agent, or Firm*—Kathryn A. Marra

(57) ABSTRACT

A vehicle-trailer back-up control system that employs an active front steer sub-system. The system includes a smart hitch controller that receives a vehicle speed signal and a hand-wheel angle signal, and calculates a hitch angle command signal. The system further includes a hitch angle sensor that measures the hitch angle between the vehicle and the trailer that is compared to the hitch angle command signal to generate a hitch angle error signal. A PID control unit receives the hitch angle error signal, and generates a corrected road wheel angle signal based on proportional and derivative gains. The corrected road wheel angle signal is used to generate a motor angle signal that is applied to a steering actuator to be combined with the steering angle signal to generate the front wheel steering signal during a back-up maneuver.

19 Claims, 4 Drawing Sheets

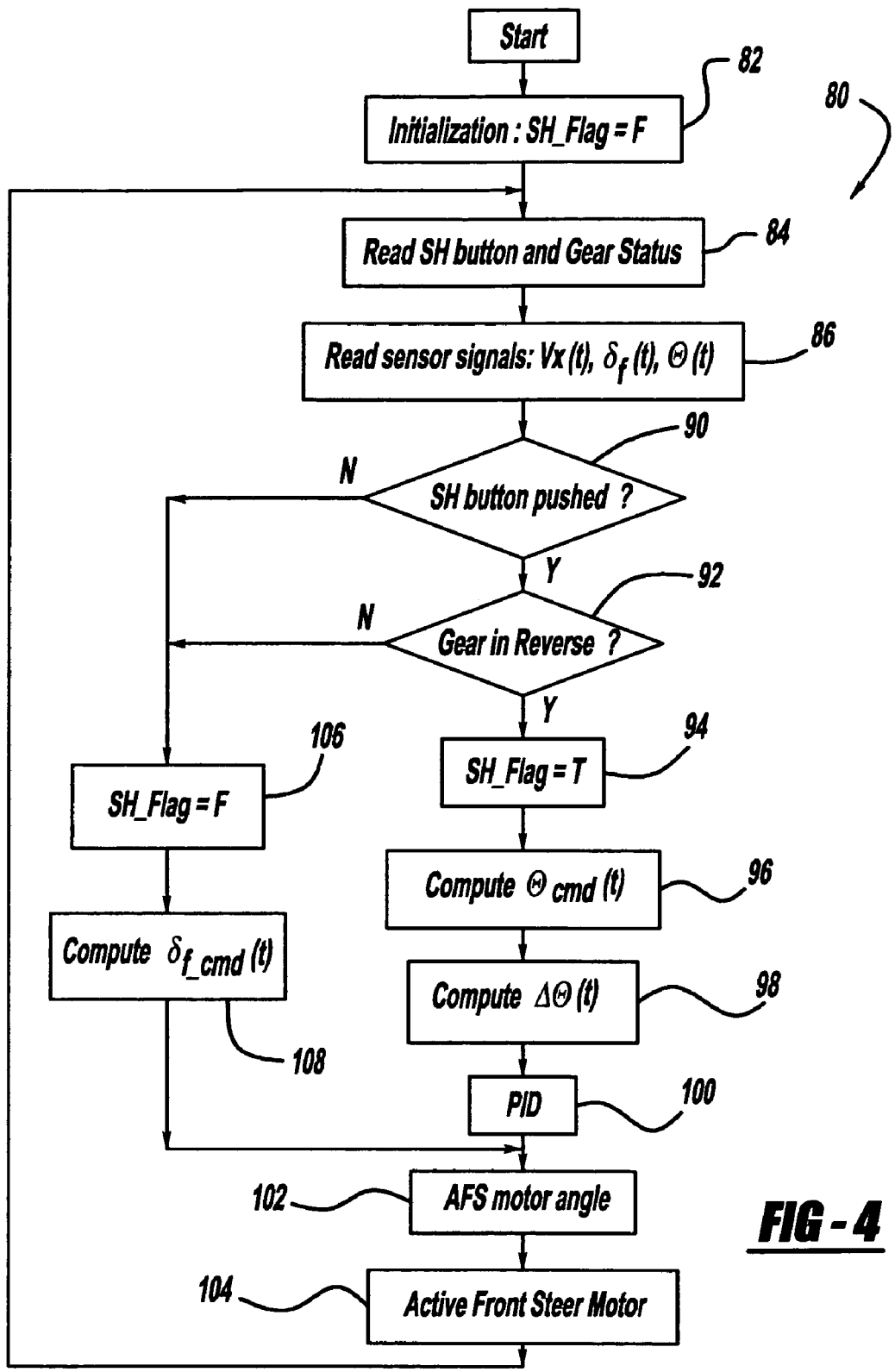

VEHICLE-TRAILER BACKING UP SYSTEM USING ACTIVE FRONT STEER

BACKGROUND OF THE INVENTION

1. Field of the Invention

This invention relates generally to a vehicle back-up control system for assisting a vehicle operator in backing up a vehicle-trailer combination and, more particularly, to a vehicle back-up control system that assists a vehicle operator in backing up a vehicle-trailer combination, where the system employs a hitch angle sensor and an active front steering sub-system.

2. Discussion of the Related Art

Backing up a vehicle-trailer combination requires proper actions by steering and/or braking the vehicle to slow down and/or stabilize the vehicle-trailer combination before a jack-knife condition occurs. Particularly, in order to position the trailer toward the target direction, the vehicle operator typically needs to provide counter-steering inputs, which are opposite to normal steering. The jack-knife condition occurs when the vehicle-trailer combination is moving away from its equilibrium position and the system becomes unstable. In other words, the relative angle between the vehicle and the trailer is diverging from the driver's intended target angle, which usually increases when proper steering and/or braking actions are not taken.

U.S. Pat. No. 6,292,094 discloses a system for controlling a backing maneuver of a vehicle-trailer combination, where the vehicle includes operator-actuated front wheel steering and microprocessor-actuated electric motor driven rear-wheel steering that uses the hand-wheel angle for a desired driver command. In this system, the hand-wheel is mechanically coupled to the road wheels through the steering mechanism. When the vehicle operator turns the hand-wheel to provide the command to the controller, the front wheels turn accordingly regardless of the driver's intention. Therefore, the front wheels may turn in-phase with the rear wheels when the driver's intention is to provide counter steering, which would be required to provide out-of-phase steering between the front and rear wheels.

Some state of the art vehicles employ an active front steering (AFS) system, known to those skilled in the art, in combination with a steer-by-wire system where the steering hand-wheel is mechanically decoupled from the vehicle wheels. In other words, the turning of the hand-wheel is electronically detected, where a controller operates the steering gear to turn the front wheels based on the detected signal. The prior art has proposed utilizing a true steer-by-wire mechanism, where the desired front wheel angle is generated based on the driver command provided through the steering hand-wheel. However, this system is limited to a theoretical control feasibility using a steer-by-wire system and instrumented hitch.

Because the known vehicle-trailer back-up control systems only interpret the driver intentions based on the hand-wheel angle, a counter steering command may produce a wrong wheel angle command that is opposite to the driver's intention. The driver should not perform a counter steer if he/she is using this back-up control feature because the counter steer is performed by the AFS. Therefore, perceiving a driver's intention accurately during trailer back-up is important for controlling the backing up motion of a vehicle-trailer combination.

SUMMARY OF THE INVENTION

In accordance with the teachings of the present invention, a vehicle-trailer back-up control system is disclosed that employs an active front wheel steer sub-system. The system includes a hand-wheel sensor for measuring the steering hand-wheel angle input from the vehicle operator, and an active front wheel steering actuator for converting the measured hand-wheel angle signal to an applicable steering signal for the vehicle. The system further includes a smart hitch controller that receives a vehicle speed signal and the hand-wheel angle signal, and, using a bicycle model or a kinematics model, calculates a hitch angle command signal. The system also includes a hitch angle sensor that measures the hitch angle between the vehicle and the trailer that is compared to the hitch angle command signal to generate a hitch angle error signal. A PID control unit receives the hitch angle error signal, and generates a corrected road wheel angle signal based on proportional and derivative gains. The corrected road wheel angle signal is applied to a process block for generating a motor angle signal that is applied to the steering actuator to be combined with the steering angle signal to generate a front wheel steering signal during a back-up maneuver.

Additional advantages and features of the present invention will become apparent from the following description and appended claims, taken in conjunction with the accompanying drawings.

BRIEF DESCRIPTION OF THE DRAWINGS

FIG. 4 is a flow chart diagram showing the operation of the AFS based back-up control system of the invention.

DETAILED DESCRIPTION OF THE EMBODIMENTS

The following discussion of the embodiments of the invention directed to an AFS based vehicle-trailer back-up control system employing a hitch angle sensor is merely exemplary in nature, and is in no way intended to limit the invention or its applications or uses.

As will be discussed in detail below, the present invention proposes an AFS based vehicle-trailer back-up control system employing a hitch angle sensor. The vehicle-trailer back-up control system of the invention only requires that the vehicle operator provide the desired command because it interprets and converts the command to the necessary steering control signals, including counter-steering. The steering gear ratio is controlled to give the effective road wheel angle. The system uses the front-wheel angle as a control input and the hand-wheel angle as a command, where the mechanical connection between the hand-wheel and the road wheels is decoupled. Although the steering wheel is still connected mechanically to the road wheels, it behaves as if it is disconnected functionally by a steer-by-wire mechanism. Therefore, the vehicle operator doesn't need to have knowledge or experience for counter steering when backing up a vehicle-trailer.

Figure 1:
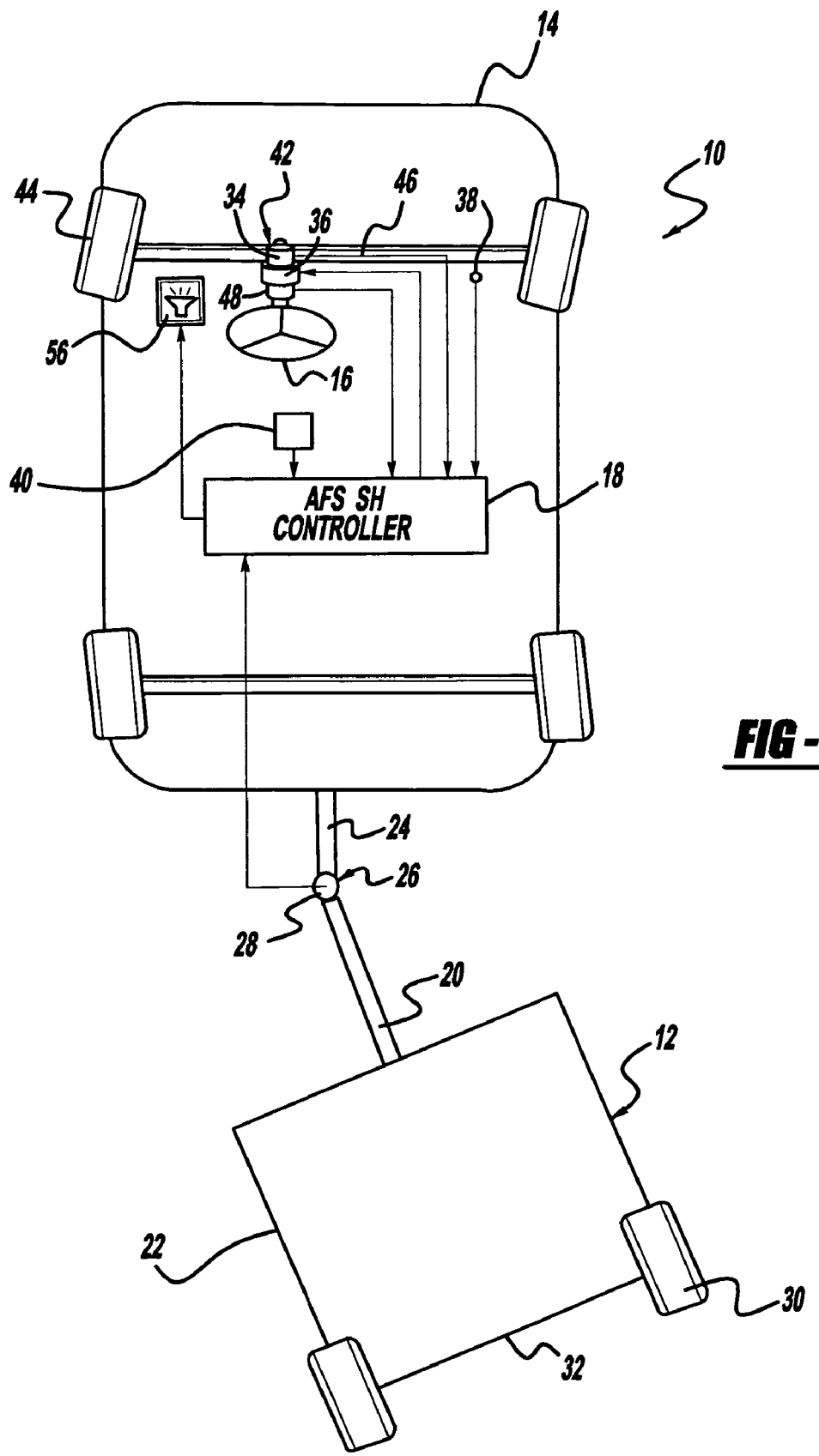
FIG. 1 is a plan view of a vehicle-trailer combination including an AFS based back-up control system, according to an embodiment of the present invention.

FIG. 1 is a plan view of a vehicle-trailer system 10 including a vehicle 14 towing a trailer 12, where the system 10 provides back-up control using an active front-wheel steering actuator and an active front steering (AFS) smart hitch (SH) controller 18. The various vehicle sensors discussed below can be any sensor suitable for the purposes discussed herein, and need not be specifically limited to any particular type of sensor. A steering hand-wheel 16 of the vehicle 14 is decoupled from the steering gear (not shown) of the vehicle 14 to provide counter steering during the back-up control by any suitable decoupling device, such as a planetary gear system or harmonic gear system.

The trailer 12 includes a trailer hitch post 20, a trailer bed 22 and trailer wheels 30 rotatably mounted to a trailer axle 32. The vehicle 14 includes a vehicle hitch post 24 having a hitch 26 that couples the hitch post 24 to the hitch post 20 in any known manner that allows the trailer 12 to be towed by the vehicle 14. The hitch 26 includes a hitch angle sensor 28 that provides an electrical signal indicative of the angle between the hitch post 24 and the hitch post 20 to the controller 18.

The steering hand-wheel 16 is mounted to a steering column 42 that allows a vehicle operator to steer front wheels 44 of the vehicle 14 through a steering linkage, the steering gear and a front wheel axle 46. A hand-wheel angle sensor 48 is mounted to the steering column 42 and provides a hand-wheel steering angle signal $\delta_{sw}(t)$ indicative of the operator's intended steering direction of the wheels 44 to the controller 18. The maximum angle movement for a particular vehicle's front wheels is generally fixed, and may be, for example, about +34° to the left and −34° to the right. The vehicle 14 also includes a vehicle speed sensor 40 that measures the speed of the vehicle 14 and provides a vehicle speed signal Vx to the controller 18. Additionally, the system 10 may include an ultrasound rear parking aid (URPA) alarm system in combination with an optional warning device 56.

The system 10 also includes a front wheel angle sensor 34 and an active front steering electric motor 36. As will be discussed in detail below, based on the steering hand-wheel angle signal $\delta_{sw}(t)$, the controller 18 computes the intended or desired hitch angle for achieving the desired backing curvature of the trailer 12. Based on the desired hitch angle and the actual hitch angle, the controller 18 provides a signal to the electric motor 36 that provides active front wheel steering assist, including counter steering, so that the desired hitch angle substantially matches the actual hitch angle. The vehicle 14 also includes a smart hitch switch 38 that allows the vehicle operator to disengage or engage the active front wheel steering when performing a back-up maneuver.

Figure 2:
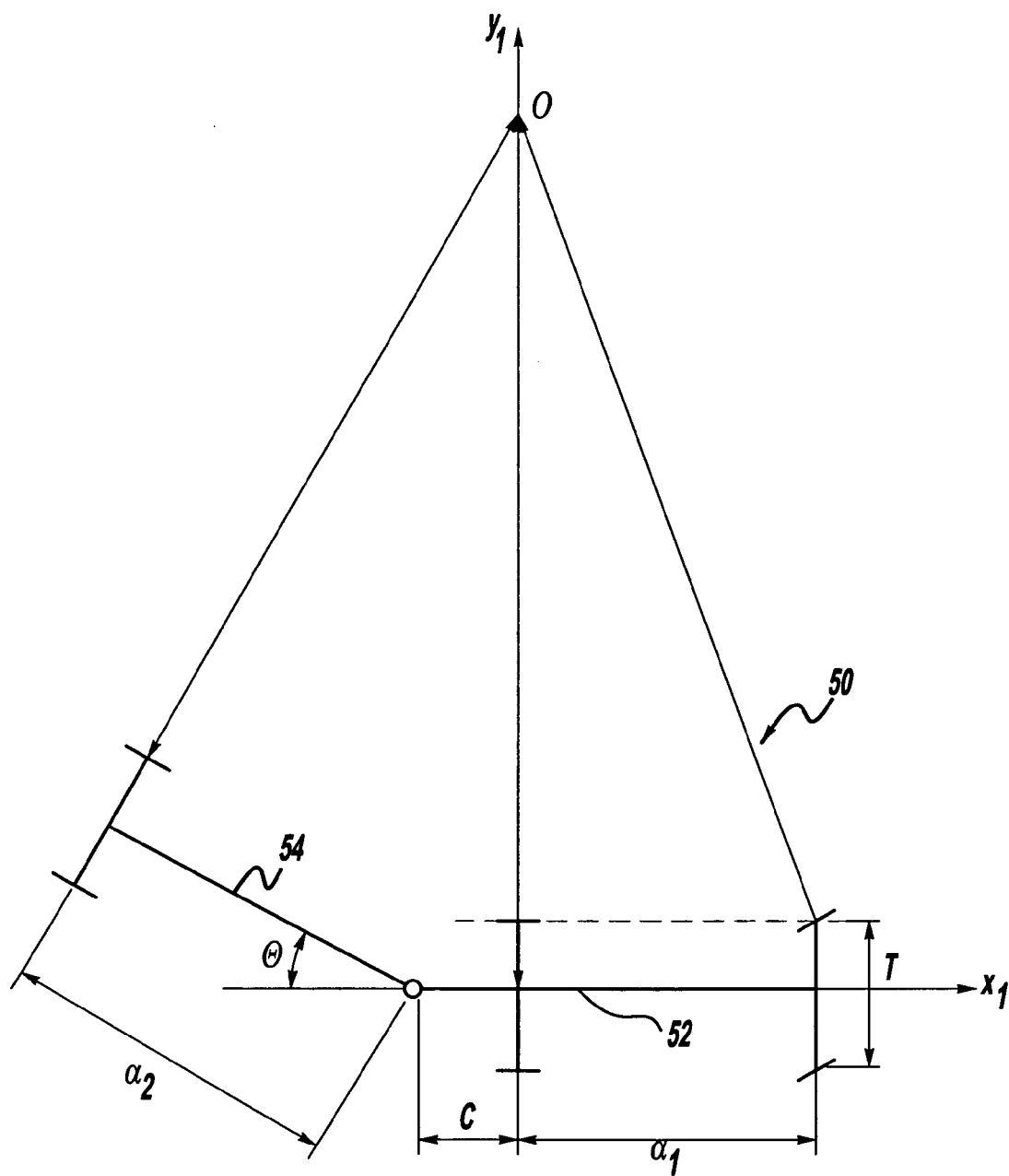
FIG. 2 is a kinematics model of a vehicle-trailer combination in an equilibrium state, where $b_1$ and $b_1$ are ignored for low speed back-up maneuvers.

The desired hitch angle is computed using a kinematics model 50, shown in FIG. 2, to generate a hitch angle command signal at the steady state or from a bicycle model using the steady state at low vehicle speed conditions. In the kinematics model 50, reference numeral 52 represents the vehicle 14 and reference numeral 54 represents the trailer 12.

The following nomenclature is used in the kinematics model and bicycle model calculations discussed below.

$x_1$ is the vehicle coordinate x-axis;
$y_1$ is the vehicle coordinate y-axis;
$a_1$ is the distance between vehicle's front axle to the vehicle's center of gravity;
$a_2$ is the distance between the hitch 26 to the trailer's center of gravity;
$b_1$ is the distance between vehicle's rear axle to the vehicle's center of gravity;
$b_2$ is the distance between the trailer's rear axle to the trailer's center of gravity;
c is the distance between the hitch 26 to vehicle's center of gravity;
T is the vehicle track width;
$C_f$ is the vehicle front tire cornering stiffness;
$C_r$ is the vehicle rear tire cornering stiffness;
$C_t$ is the trailer tire cornering stiffness;
$K_p$ is the proportional control gain;
$K_d$ is the derivative control gain;
$I_{z1}$ is the vehicle moment of inertia around the trailer's center of gravity;
$I_{z2}$ is the trailer moment of inertia around the trailer's center of gravity;
$m_1$ is the vehicle mass;
$m_2$ is the trailer mass;
r is the vehicle yaw rate;
t is the system time;
$t_0$ is the initial system time;
u is the vehicle longitudinal speed;
v is the vehicle lateral speed;
$\chi$ is the system state variables;
$\bar{x}_{eq}$ is the state equilibrium point;
$\dot{\phi}$ is the hitch angle rate;
$\theta$ is the hitch angle;
$\bar{\theta}_{eq}$ is the hitch equilibrium angle;
$\delta_{fw}$ is the vehicle front wheel angle;
$\delta_{sw}$ is the steering hand-wheel angle;
$\delta_m$ is the AFS motor angle;
$K_{vr}$ is the AFS open-loop control gain;
$G_o$ is the normal steering gear ratio; and
$G_v$ is the variable steering gear ratio.

Figure 3:
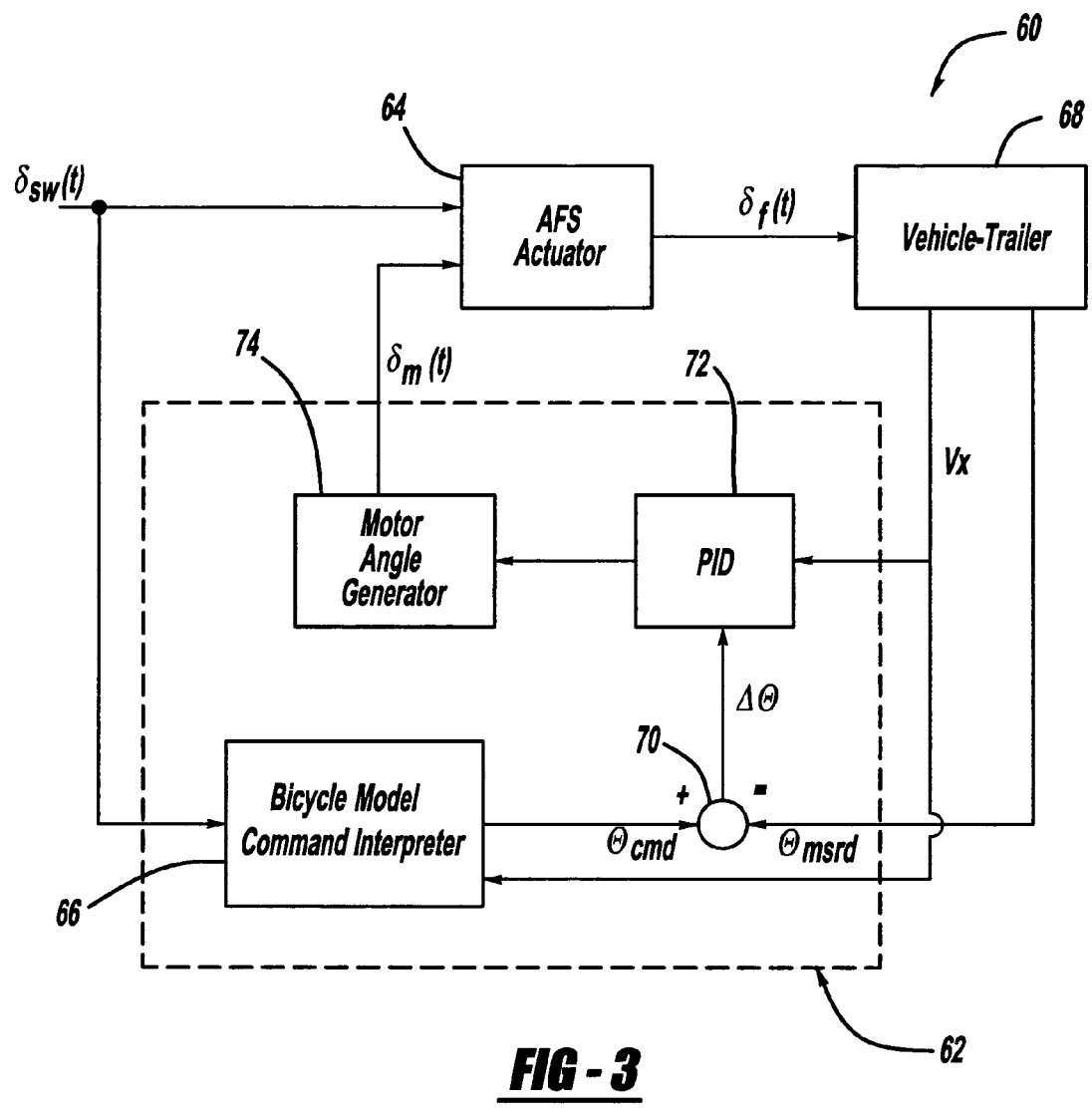
FIG. 3 is a functional block diagram of the AFS based back-up control system of the invention.

FIG. 3 is a block diagram of an AFS based smart hitch system 60 for the system 10, according to an embodiment of the present invention. The system 60 includes a trailer back-up controller 62 representing the controller 18 and an AFS actuator 64 representing the electric motor 36. A vehicle-trailer combination process block 68 represents the combination of the trailer 12 and the vehicle 14, and provides the measured hitch angle signal $\theta_{msrd}(t)$ from the hitch angle sensor 28 and the vehicle speed signal Vx from the vehicle speed sensor 40. The vehicle-trailer combination process block 68 receives a front assist steering angle signal $\delta_f(t)$ that provides the active front wheel steering consistent with the discussion herein.

The steering hand-wheel signal measured by the sensor 48 is applied to the actuator 64 since there is a direct linkage and a bicycle model process block 66, or command interpreter, within the controller 62. The bicycle model process block 66 uses the steering hand-wheel angle signal $\delta_{sw}(t)$ and the vehicle speed signal Vx to generate a desired hitch angle command signal $\theta_{cm}(t)$ as discussed below. The linear bicycle model can be formulated in a matrix form as:

$$M\dot{x} = A_1 x + B_1 U \quad (1)$$

$$\text{or } \dot{x} = Ax + BU \quad (2)$$

Where $x = [v\ r\ \phi\ \theta]^T$ of are state variables and $U = [\delta_{sw}\ 0]^T$ is a control input.

The system matrix A and the input matrix B are defined as:

$$A = \frac{A_0^{-1}}{u}\begin{bmatrix} -(C_f + C_r + C_t) & -a_1 C_f + b_1 C_r + (c + a_2 + b_2)C_t - (m_1 + m_2)u^2 & (a_2 + b_2)C_t & uC_t \\ -(a_1 + c)C_f + (c - b_1)C_r & -a_1(a_1 + c)C_f + b_1(c + b_1)C_r - m_1 c u^2 & 0 & 0 \\ (a_2 + b_2)C_t & (a_2 + b_2)(c + a_2 + b_2)C_t + m_2 a_2 u^2 & -(a_2 + b_2)^2 C_t & -u(a_2 + b_2)C_t \\ 0 & 0 & u & 0 \end{bmatrix} \quad (3)$$

$$B = A_0^{-1}\begin{bmatrix} C_f & C_r \\ (a_1 + c)C_f & (c - b_1)C_r \\ 0 & 0 \\ 0 & 0 \end{bmatrix} \quad (4)$$

$$A_0 = \begin{bmatrix} m_1 + m_2 & -m_2(c + a_2) & 0 \\ m_1 c & I_{z1} & 0 \\ -m_2 a_2 & I_{z2} + m_2 a_2 + m_2 c a_2 & 0 \\ 0 & 0 & 1 \end{bmatrix} \quad (5)$$

A hitch equilibrium hitch angle $\bar{\theta}_{eq}$ is calculated by solving the algebraic equations (1) and (2) a $\dot{x}=0$. From the linear bicycle model and the equations (1) and (2), the equilibrium point can be obtained as:

$$\bar{x}_{eq} = -A^{-1}BU \quad (6)$$

$$\bar{\theta}_{eq} = \bar{x}_{eq}[4] = f(A,B,U) = f(\Gamma, u, \delta_f) = \bar{\theta}_{cmd} \quad (7)$$

Where $\Gamma$ represents the dynamic and kinematic parameters of the vehicle-trailer combination, and u is the vehicle traveling speed. The system 10 has only one equilibrium point whether the vehicle-trailer combination moves forward or backward. The hitch equilibrium angle $\bar{\theta}_{eq}$ is chosen as the desired hitch angle command $\theta_{cmd}(t)$.

The hitch angle command signal $\theta_{cmd}(t)$ from the process block 66 is compared to the measured hitch angle $\theta_{msrd}(t)$ from the hitch angle sensor 28 in a summer 70 to compute a hitch angle error signal $\Delta\theta(t)$ as:

$$\Delta\theta(t) = \theta_{cmd}(t) - \theta_{msrd}(t) \quad (8)$$

In this manner, the hitch angle error signal $\Delta\theta(t)$ is minimized by properly controlling the front wheel steering angle. Particularly, the system 60 attempts to maintain the hitch angle command signal $\theta_{cmd}(t)$ as close to the measured hitch angle $\theta_{msrd}(t)$ as possible.

The hitch angle error signal $\Delta\theta(t)$ is applied to a PID control unit 72 to compute a corrected front road wheel angle $\delta_{f\_cmd}(t)$ as:

$$\delta_{f\_cmd}(t) = K_p * \Delta\theta(t) + K_d * \frac{d\theta(t)}{dt} \quad (9)$$

The proportional and derivative gains are used to compute the desired front wheel angle. The proportional gain $K_p$ is adjusted based on the vehicle longitudinal speed, so that it is at a maximum when the vehicle speed is close to zero and varies according to the change in the vehicle speed. The derivative gain $K_d$ is a constant.

The corrected front road wheel angle $\delta_{f\_cmd}(t)$ is applied to a motor angle generator process block 74 to generate a motor angle signal $\delta_m(t)$ that provides the steering correction.

The front road wheel angle $\delta_{fw}(t)$ is controlled using the electric motor 36 that modifies the hand-wheel angle signal $\delta_{sw}(t)$ from the sensor 48 according to the gain schedule:

$$\delta_{fw}(t) = \frac{\delta_{sw}(t) + \delta_m(t)}{G_0} = \frac{(1 + K_{vr})\delta_{sw}(t)}{G_0} \quad (10)$$

The open-loop AFS control gain $K_{vr}$ is typically a function of the vehicle speed signal Vx. As a result, the electric motor 36 operates on a variable ratio as a function of the vehicle speed signal Vx as:

$$G_v = \frac{G_0}{1 + K_{vr}} \quad (11)$$

A typical $G_v$ curve is designed to have a value lower than the standard gear ratio $G_o$ at lower speeds and greater than the standard gear ratio $G_o$ at higher speeds.

When the time comes to use the AFS back-up control for trailer backing up, the controller 62 receives the steering hand wheel angle signal $\delta_{sw}(t)$ to use the electric motor 36 in a different way than it's normally used in the equation (10). When the steering hand-wheel angle signal $\delta_{sw}(t)$ is received, the AFS control enters a trailer back-up mode to control the motor angle signal $\delta_m(t)$. The driver's desire for using the AFS back-up control can be facilitated by the switch 38 and by activating a switch normally used for other functionalities. For example, the driver intent can be recognized by prescribing a sequence of switch activations, such as for example, putting the transmission in the reverse gear and turning on the switch 38.

When the AFS back-up control is on, equation (12) below should hold between the hand-wheel angle signal $\delta_{sw}(t)$ and the front road wheel angle signal $\delta_{fw}(t)$.

$$\delta_{f\_cmd}(t) = \frac{\delta_{sw}(t) + \delta_m(t)}{G_0} \quad (12)$$

Where $G_0$ is a fixed gear ratio. Therefore, the motor angle signal $\delta_m(t)$ provided to the AFS actuator 64 should be:

$$\delta_m(t) = G_0 * \delta_{f\_cmd}(t) - \delta_{sw}(t) \quad (13)$$

FIG. 4 is a flow chart diagram 80 showing the operation of the control algorithm for controlling the active front steering for backing up the vehicle-trailer combination 10. The control algorithm is initialed at box 82 by setting a smart hitch flag to false. The control algorithm then determines whether the switch 38 is on and what gear the vehicle 14 is in at box 84. The control algorithm then reads the sensor signals for the vehicle speed signal Vx, the measured hitch angle $\theta_{msrd}(t)$ and the hand-wheel sensor signal $\delta_{sw}(t)$ at box 86. The algorithm then determines whether the switch 38 is on at decision diamond 90.

If the smart hitch switch 38 is on at the decision diamond 90, the control algorithm knows that the vehicle operator just activated it. The controller algorithm then determines whether the vehicle 14 is in the reverse gear at decision diamond 92. If the vehicle 14 is in the reverse gear, then the control algorithm sets the smart hitch flag true at box 94 and computes the hitch angle command signal $\theta_{cmd}$ in the process block 66 at box 96. The control algorithm then determines the difference between the hitch angle command signal $\theta_{cmd}$ and the measured hitch angle $\theta_{cmd}$ in the summation device 70 at box 98. The control algorithm then determines the PID control in the PID process box 72 at box 100, the motor angle signal $\delta_m(t)$ from the process block 74 at box 102 and the steering signal at box 104.

If the switch 38 is not on at the decision diamond 90 or the vehicle 14 is not in the reverse gear at the decision diamond 92, then the control algorithm sets the smart hitch flag false at box 106, and computes the active steering signal with the back-up control off from the equation (9) at box 108. The control algorithm then proceeds to determining the motor angle signal $\delta_m(t)$ at the box 102 skipping the processing for the smart hitch calculations.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing active front steering for a vehicle and trailer combination during a back-up maneuver, said method comprising:
   determining a steering wheel angle signal indicative of a steering hand-wheel of the vehicle;
   determining a vehicle speed signal indicative of the speed of the vehicle;
   using the steering wheel angle signal and the vehicle speed signal to calculate a hitch angle command signal;
   measuring an actual hitch angle between the vehicle and the trailer and providing a measured hitch angle signal;
   comparing the hitch angle command signal to the measured hitch angle signal to provide an error signal;
   determining a corrected front road wheel angle signal based on the error signal and the vehicle speed signal;
   using the corrected road wheel angle signal to generate an actuator angle signal; and
   using the actuator angle signal and the steering wheel angle signal to control an active front wheel steering actuator to steer the vehicle-trailer combination during the back-up maneuver.

2. The method according to claim 1 wherein controlling the front wheel steering actuator includes controlling an electric motor.

3. The method according to claim 1 wherein determining the corrected road wheel angle signal includes using a PID control unit.

4. The method according to claim 1 wherein using the steering wheel angle signal and the vehicle speed signal to calculate a hitch angle command signal includes employing a bicycle model to calculate the hitch angle command signal.

5. The method according to claim 1 wherein using the steering wheel angle and the vehicle speed signal to calculate a hitch angle command signal includes employing a kinematics model to calculate the hitch angle command signal.

6. The method according to claim 1 wherein the steering hand-wheel is decoupled from a steering gear of the vehicle to provide counter steering.

7. The method according to claim 1 further comprising determining whether a switch has been activated and the vehicle is in a reverse gear before using the actuator angle signal and the steering wheel angle signal to steer the vehicle.

8. A system for providing active front steering for a vehicle and trailer combination during a back-up maneuver, said system comprising:
   a steering hand-wheel sensor for providing a steering wheel angle signal indicative of the angle of a steering hand-wheel of the vehicle;
   a vehicle speed sensor for providing a vehicle speed signal indicative of the speed of the vehicle;
   a hitch angle sensor for providing a measured hitch angle signal of the hitch angle between the vehicle and the trailer;
   a command interpreter responsive to the steering wheel angle signal and the vehicle speed signal, said command interpreter calculating a hitch angle command signal;
   a comparator responsive to the hitch angle command signal and the measured hitch angle signal, said comparator providing an error signal;
   a control unit responsive to the error signal and the vehicle speed signal, said control unit determining a corrected front road wheel angle signal;
   a generator responsive to the corrected road wheel angle signal, said generator generating an actuator angle signal; and
   an active front steering actuator responsive to the actuator angle signal and the steering wheel angle signal, said active front steering actuator providing a steering signal for steering the vehicle-trailer combination during the back-up maneuver.

9. The system according to claim 8 wherein the front steering actuator includes an electric motor.

10. The system according to claim 8 wherein the control unit is a PID control unit.

11. The system according to claim 8 wherein the command interpreter employs a bicycle model to calculate the hitch angle command signal.

12. The system according to claim 8 wherein the command interpreter employs a kinematics model to calculate the hitch angle command signal.

13. The system according to claim 8 wherein the steering hand-wheel is decoupled from a steering gear of the vehicle to provide counter steering.

14. The system according to claim 8 further comprising a switch for activating and deactivating the system.

15. A system for providing active front steering for a vehicle and trailer combination during a back-up maneuver, said system comprising:
- a steering hand-wheel sensor for providing a steering wheel angle signal indicative of the angle of a steering hand-wheel of the vehicle;
- a hitch angle sensor for providing a measured hitch angle signal of the hitch angle between the vehicle and the trailer; and
- an active front steering sub-system that uses the steering wheel angle signal and the measured hitch angle signal for providing an active steering signal for steering the vehicle-trailer combination during the back-up maneuver.

16. The system according to claim 15 wherein the active front steering sub-system employs a bicycle model or a kinematics model to calculate a hitch angle command signal that is compared to the measured hitch angle signal.

17. The system according to claim 15 wherein the front steering sub-system includes an electric motor for providing an active steering angle signal.

18. The system according to claim 15 wherein the front steering sub-system employs a PID control unit.

19. The system according to claim 15 wherein the steering hand-wheel is decoupled from a steering gear of the vehicle to provide counter steering.

* * * * *